SYSTEM FOR ELIMINATING JITTER FROM VIDEO SIGNALS

Filed May 3, 1965

INVENTOR.
NOBUTOSHI KIHARA
BY
Ward, Haselton, McElhannon,
Orme, Brooks & Fitzpatrick
ATTORNEYS INVENTOR.
NOBUTOSHI KIHARA
BY
Ward, Haselton, Mc Elhannon, Orme, Brooks & Fitzpatrick
ATTORNEYS INVENTOR.
NOBUTOSHI KIHARA
BY
Ward, Haselton, McElhannon, Orme, Brooks & Fitzpatrick
ATTORNEYS INVENTOR.
NOBUTOSHI KIHARA
BY
Ward, Haselton, McElhannon, Orme, Brooks & Fitzpatrick
ATTORNEYS United States Patent Office
3,419,675
Patented Dec. 31, 1968

3,419,675

SYSTEM FOR ELIMINATING JITTER FROM VIDEO SIGNALS

Nobutoshi Kihara, Tokyo, Japan, assignor to Sony Corporation, Tokyo, Japan, a corporation of Japan
Filed May 3, 1965, Ser. No. 452,467
Claims priority, application Japan, May 2, 1964, 39/24,942
11 Claims. (Cl. 178—6.6)

ABSTRACT OF THE DISCLOSURE

Apparatus for eliminating the jitter components from reproduced video signals are provided and comprise means for selectively varying the position of video signal reproducing means with respect to a video signal recording medium in accordance with jitter components in said video signals to reproduce signals having no jitter components.

This invention relates in general to a system for eliminating the jitter components which are present in electrical signals, and more particularly to a system and device for eliminating the jitter components that are contained in video signals that are reproduced by a magnetic video recording reproducing apparatus commonly referred to as a VTR.

In magnetic video recording and reproducing apparatus jitter components are present in the reproduced signals because of errors in the mechanical components of the apparatus, such as the capstan for driving the magnetic tape, and the motor for driving the rotary magnetic head. This is particularly true of portable video tape recorders which are of extremely simplified design. With video tape recorders presently available it is impossible to eliminate the jitter component, since the units are not provided with any means for accomplishing this. The jitter components range from one to sixty cycles per second, but are primarily concentrated in the range between three to ten cycles per second. The higher frequency jitter components are extremely small in the component level and can be neglected in practice.

In view of the foregoing, the primary object of the present invention is to provide a method and system for eliminating the jitter components from video signals.

Another object of the present invention is to provide apparatus for effectively eliminating jitter components from video signals that are reproduced by magnetic video recording and reproducing apparatus.

A further object of the present invention is to provide a system and apparatus in which signals, including timing signals, that are reproduced by one video tape recorder are recorded and reproduced by a second magnetic recording and reproducing apparatus, and in which the magnetic reproducing head of the second apparatus is controlled by jitter components that are produced by a comparison of the timing signals contained in the reproduced output of the second apparatus with a reference signal thereby eliminating the jitter components from the signals.

A still further object of the present invention is to provide a system and apparatus for eliminating the jitter components from video signals in which system the video signals, including timing signals, are recorded on a magnetic medium by a fixed magnetic head of a first magnetic recording and reproducing apparatus, and subsequently reproduced by a moving magnetic reproducing head. In this system the timing signals are separated from the reproduced output and the jitter components of the video signals are detected by comparing the timing signals with a reference signal. The moving magnetic head is then controlled in accordance with the jitter components in order to eliminate the same.

These and further objects and features of the present invention will appear from a reading of the following detailed description of various embodiments of the invention to be read in conjunction with the accompanying drawings wherein like components in the several views are identified by the same reference numerals.

Figure 1:
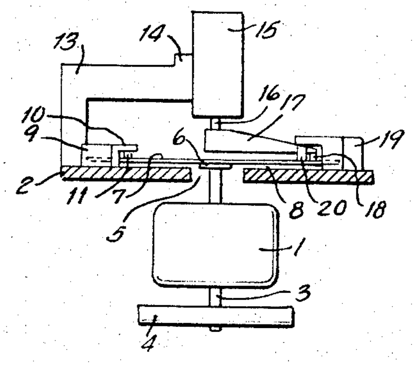
FIGURE 1 is a schematic front view of one embodiment of a magnetic recording and reproducing apparatus which is applicable to the jitter eliminating system of the present invention.
Figure 2:
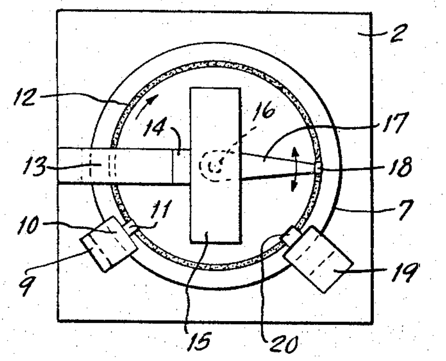
FIGURE 2 is a plan view of the apparatus illustrated in FIGURE 1.

Referring now to the figures and particularly to FIGURES 1 and 2, there is illustrated a synchronous motor 1 mounted on a base plate 2 in such a manner that the rotary shaft 3 of the synchronous motor extends in a vertical direction. A flywheel 4 is attached to the lower free end of the rotary shaft 3 in order to obtain uniform rotation of the rotary shaft. The opposite end of the rotary shaft 3 extends through an opening 5 in the base plate 2 and has attached to the free end thereof a turntable 6 which is spaced above the plane of the base plate 2. A flexible disc-like magnetic sheet 7 is mounted on the turntable 6. The arrangement of the various parts is such that when the rotary shaft 3 rotates at high speed the magnetic sheet 7 while rotating is maintained in light contact relationship with the magnetic heads 11 and 18 in a manner and for a purpose to be presently described.

A support member 9 is mounted on one edge of the base plate 2 and a recording magnetic head 11 is mounted on a protruding edge portion 10 of the support member 9. The magnetic head 11 is so mounted as to contact the rotary magnetic sheet 7 in order to form thereon magnetic tracks 12 as the rotary magnetic sheet 7 rotates. On another marginal end portion of the base plate 2 is mounted a second support member 13 on the free end portion 14 of which is mounted a head controlling mechanism 15. The controlling mechanism 15 may, for example, have the same structure as a moving coil type galvanometer with its rotary shaft 16 arranged coaxial with the rotary shaft 3. a moving arm 17 is secured to the rotary shaft 16 and on a free end of the arm 17 there is mounted a magnetic reproducing head 18 which is also arranged in such manner as to make contact with the magnetic tracks 12. It should be noted that it is important to minimize inertia in the controlling mechanism 15 including the moving arm 17. In addition, the recording and reproducing magnetic heads 11 and 18 may be disposed in close proximity but preferably due to considerations of magnetic shielding are placed as far apart as possible.

On a marginal portion of the base plate 2 removed from the support member 9 a third support member 19 is mounted. An erasing head 20 is attached to the free end of the support member 19, the head 20 being mounted in such a position as to follow after the recording magnetic head 11.

Figure 3:
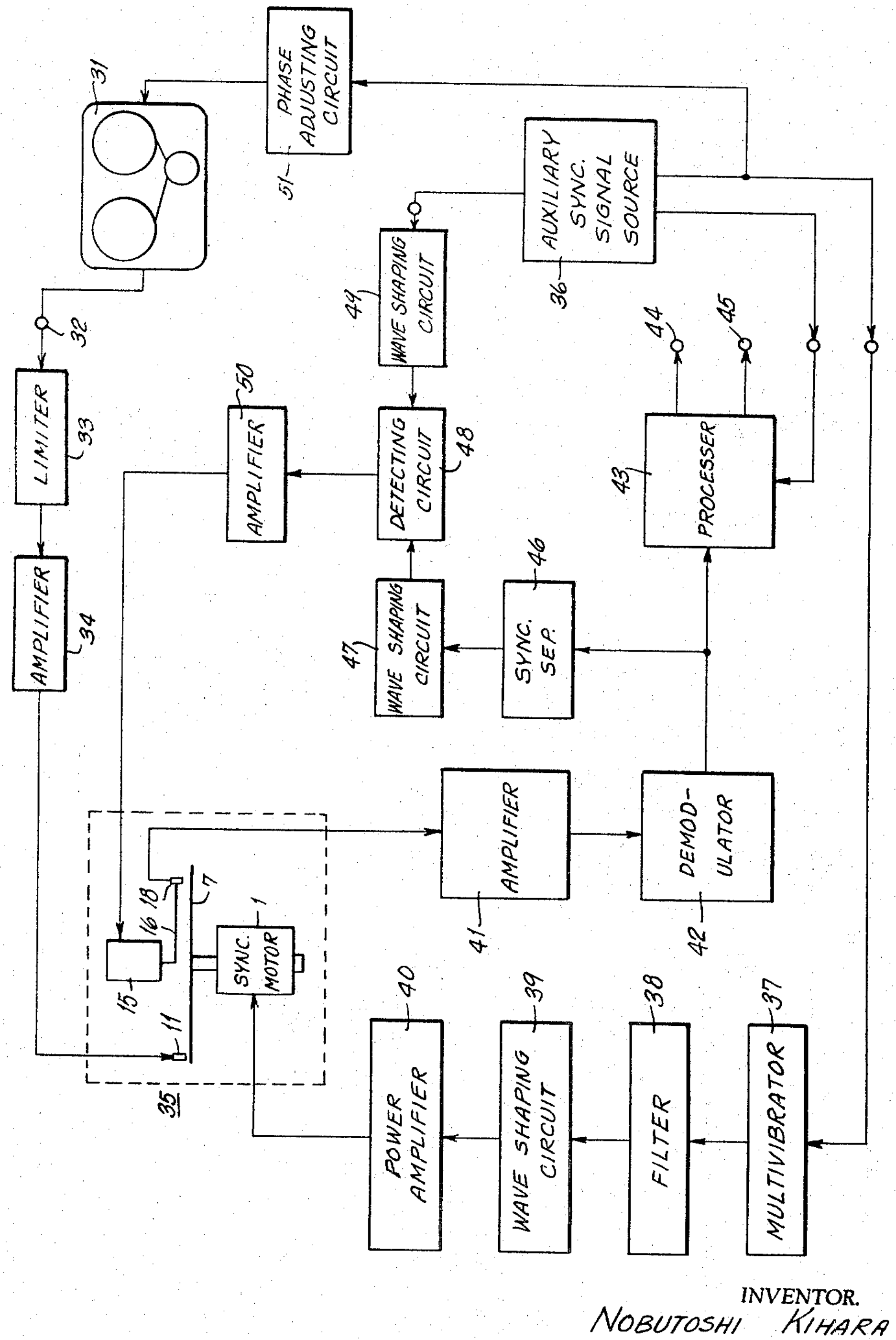
FIGURE 3 is a block diagram illustrating one embodiment of a system in accordance with the present invention.

Referring now to FIGURE 3 the numeral 31 identifies an ordinary magnetic video recording and reproducing apparatus, such, for example, as a simplified portable VTR in which frequency modulated or phase-modulated video signals, including timing signals, such, for example, as synchronizing signals, are recorded or reproduced. The output terminal for the reproduced video signal is identified by the numeral 32. The numeral 36 identifies an auxiliary synchronizing signal source for the synchronous driving and operation of the VTR 31, the apparatus 36 supplying a vertical synchronizing signal to the VTR 31 through the phase adjusting circuit 51. The output terminal 32 of the VTR 31 is connected through a limiter 33 and an amplifier 34 to the magnetic recording head 11 of a magnetic recording and reproducing apparatus such as those illustrated in FIGURES 1 and 2 and identified by the numeral 35 in FIGURE 3. A modulated video signal is recorded on the endless magnetic track 12 of the magnetic sheet 7.

The numeral 37 identifies a monostable multivibrator having a frequency of 60 cycles per second which is driven, for example, by the vertical synchronizing pulses from the synchronizing signal source 36. The output of the multivibrator 37 is supplied to a power amplifier 40 through a filter 38 in order to obtain a sine wave and then through a wave shaping circuit 39. The output of the power amplifier 40 is supplied to the synchronous motor 1 of the apparatus 35. In this manner the magnetic sheet 7 rotates at a substantially constant high speed, such, for example, as 3600 revolutions per minute.

The reproducing magnetic head 18 of the apparatus 35 is connected through an amplifier 41 to a demodulator 42 and the reproduced output of the modulated video signal recorded by the magnetic head 11 is demodulated in the demodulator 42. The demodulated signal is then supplied to a processor 43 to which a desired blanking signal is supplied in advance from the synchronizing signal source 36. In this manner a video signal which has no jitter component is obtained from one output terminal 44 of the processor 43. If desired or necessary a synchronizing signal can be obtained from the other terminal 45 as a timing signal pulse which also has no jitter components. The manner in which this is done will now be described.

The video signal of the demodulator 42 is applied to a separating circuit 46 in order to obtain a horizontal synchronizing signal. This horizontal synchronizing signal is supplied to an error signal detecting circuit 48 through a wave shaping circuit 47. Another synchronizing signal is similarly applied to the detecting circuit 48 as a reference signal from a synchronizing signal source 36 through a wave shaping circuit 49. The detected ouptut of the detecting circuit 48 is then applied through an amplifier 50 to, for example, an exciting coil or a moving coil of the controlling mechanism 15 of the apparatus 35.

With the apparatus just described, which is basically a servo mechanism, if there is no difference in time between the reference signal from the synchronizing signal source 36 and the horizontal synchronizing signal or timing signal from the separating circuit 46, or, where there is a difference, but it is constant, the output of the detecting circuit 48 is zero or constant so that the moving arm 16 of the controlling mechanism 15 will lie at its predetermined position. If, however, there is any difference in time between the two signals, or a variation, an output is obtained from the detecting circuit 48 corresponding to this difference or variation. This output from the detecting circuit 48 is then supplied to the controlling mechanism 15 and as a result the magnetic head 18 is slightly displaced along track 12. In this manner any difference in the output from the circuit 48 is brought about or depends upon the jitter components in the video signal. Due to this compensation it is possible to obtain video signals from which the jitter components have been eliminated, this jitter free video signal being obtained at the output terminal 44.

Figure 4:
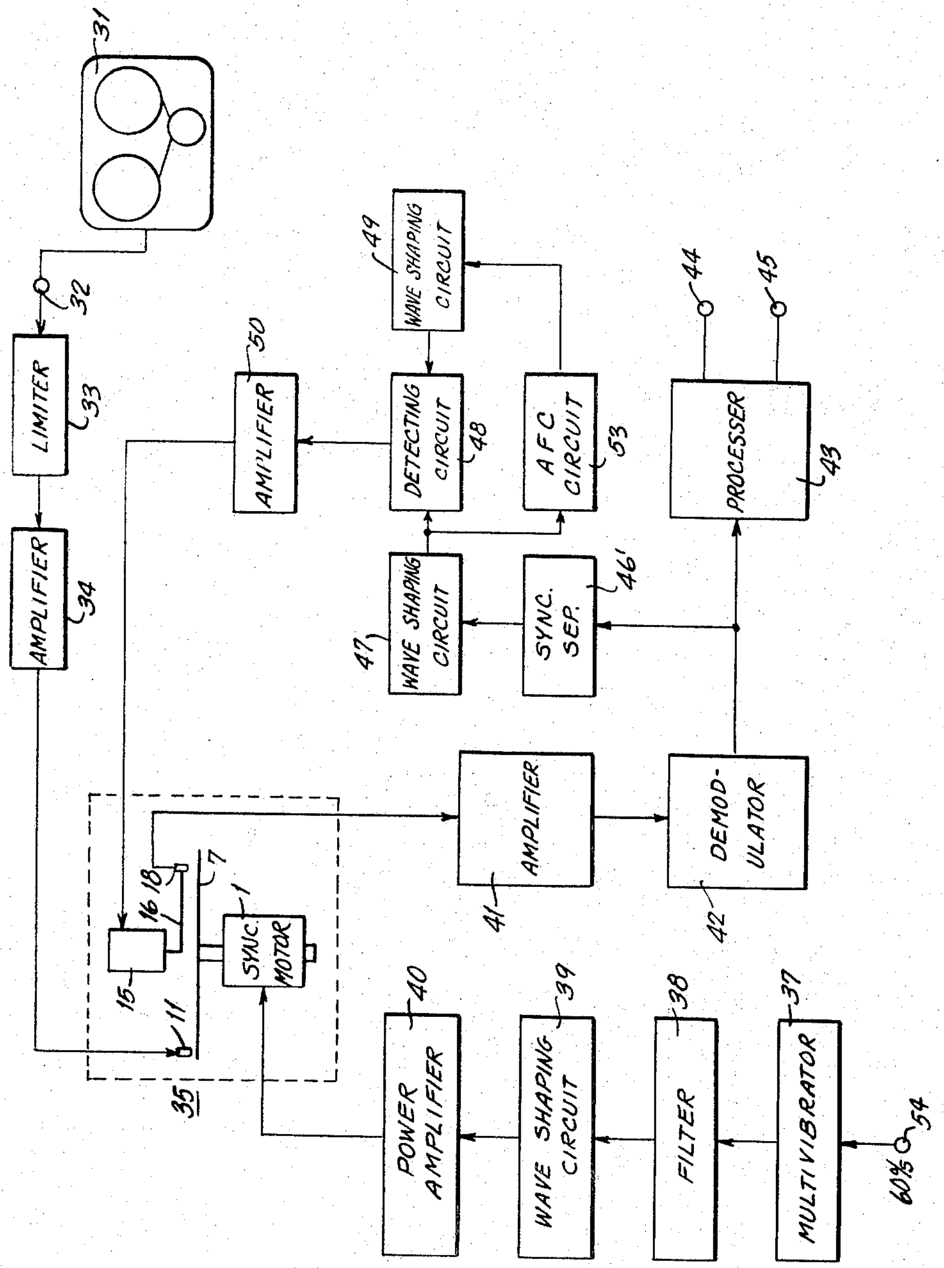
FIGURE 4 is a block diagram illustrating another system in accordance with the present invention.

As stated above, the system illustrated in FIGURE 3 is basically a servo mechanism. In FIGURE 4 there is illustrated a system where an AFC circuit 53 is provided in place of the auxiliary synchronizing signal source 36 illustrated in FIGURE 3. The operation of this system is as follows. One portion of the output of a wave shaping circuit 47 is applied to the AFC circuit 53, the output of which controls an error signal detecting circuit 48. The AFC circuit 53 is preferably provided with a phase comparator and a variable oscillating circuit which responds to the output. In the phase comparator a horizontal synchronizing signal from the circuit 47, and the output of the oscillating circuit, are compared in phase and an error signal produced by the comparison is supplied to the oscillating circuit thereby adjusting its oscillating frequency or phase. It will be evident to those skilled in the art that any other known AFC circuits can be employed for this purpose. In this connection it is preferred that the time constant of the AFC circuit be selected to be substantially the same as that of the AFC circuit of a television receiver for reproducing video signals, or a value such that it responds to variations in the horizontal synchronizing signal of, for example, less than ten cycles per second, but does not respond to those of any signals of higher frequencies. In such a case at the output end of the error signal detecting circuit 48 there is obtained the variations of less than ten cycles per second as error signals and filter components corresponding to the error signals of less than ten cycles per second are eliminated in the magnetic recording and reproducing apparatus 35.

As illustrated in FIGURE 4, the power source for the motor 1 is directly supplied from a commercial power source 54 of, for example, sixty cycles per second, which is applied to a multivibrator 37. The other parts of the circuit are similar to those described with reference to FIGURE 3 so that a detailed explanation will not be repeated.

Figure 5:
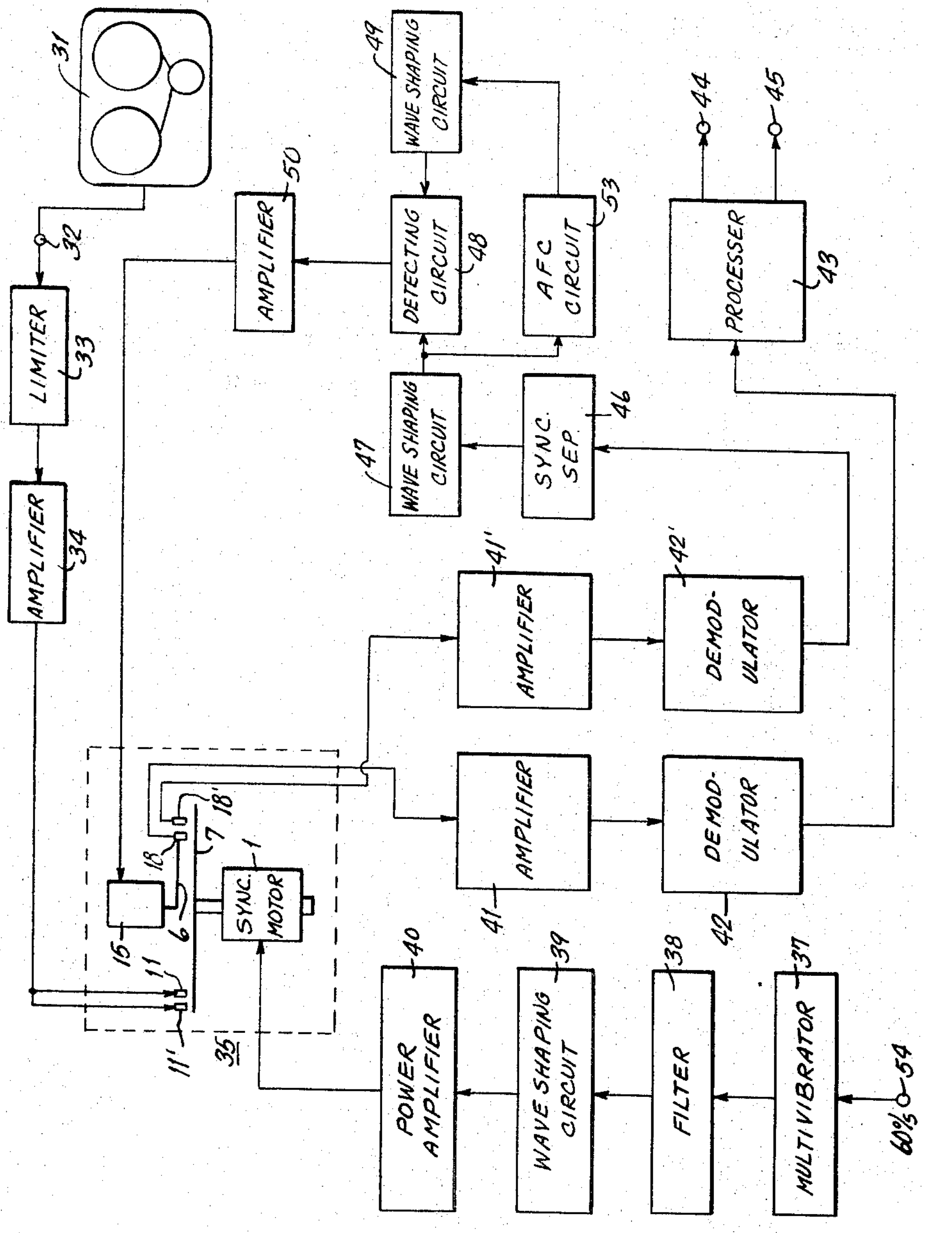
FIGURE 5 is a block diagram illustrating a modification of the system illustrated in FIGURE 4.

In FIGURE 5 there is illustrated a system similar to the system illustrated in FIGURE 4 but in which an auxiliary reproducing magnetic head 18', an amplifier 41' and a demodulator 42' have been added to the circuit illustrated in FIGURE 4. The auxiliary reproducing magnetic head 18' is preferably disposed as close to the moving reproducing magnetic head 18 as possible. In such a case a magnetic head 11 having a relatively wide track can be employed or if preferred an auxiliary recording magnetic head 11' may also be used. It should be noted, however, that the auxiliary heads 11' and 18' are only required to handle a frequency range corresponding to the synchronizing signal. The operation of the system illustrated in FIGURE 5 is substantially the same as that illustrated in FIGURE 4 and therefore no detailed description will be given.

Figure 6:
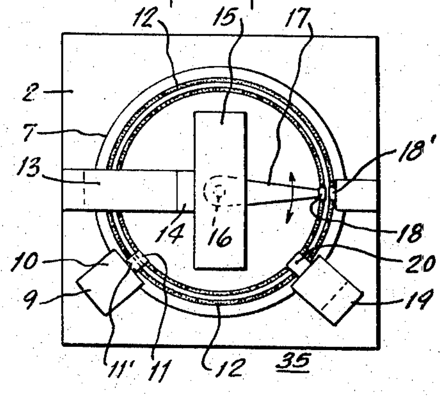
FIGURE 6 is a plan view of one embodiment of a magnetic recording and reproducing apparatus to be utilized in conjunction with the system of the present invention illustrated in FIGURE 5.

In FIGURE 6 there is illustrated a top view of the apparatus 35 illustrated in FIGURE 5. This figure illustrates that on the magnetic sheet 7 there are formed two channels such as tracks 12 and 12'.

Figure 7:
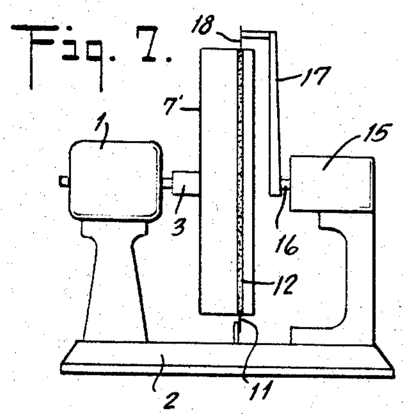
FIGURE 7 is a front view illustrating another embodiment of a magnetic recording and reproducing apparatus to be used in conjunction with one of the systems of the present invention.
Figure 8:
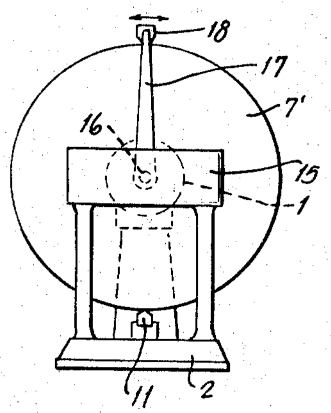
FIGURE 8 is a side view of the apparatus illustrated in FIGURE 7.

The foregoing description has been given in connection with apparatus where the jitter components are eliminated by the use of a magnetic apparatus 35 having a fixed magnetic head and a moving magnetic head which are contacted by a rotating magnetic sheet. It is to be understood, however, that the same results can be obtained by the use of an apparatus such as illustrated in FIGURES 7 and 8. In the apparatus illustrated in FIGURES 7 and 8 the motor 1' is mounted on the base plate 2' in the horizontal direction as illustrated and a rotary magnetic drum 7' is mounted on a shaft 3' of the motor 1'. On the opposite side from the motor 1' a controlling mechanism 15' is disposed coaxially with the shaft 3' and a moving arm 17' is attached to the shaft 16' of the controlling mechanism 15'. A moving magnetic head 18' is mounted at the free end of the arm 17' in such manner as to contact the magnetic drum 7'. A fixed magnetic head 11' is mounted on the base plate 2' and made to contact the drum 7'. It will be apparent from the foregoing that many modifications and variations of the structure described may be effected without departing from the scope of the present invention as defined in the appended claims.

I claim:

1. Apparatus for eliminating jitter components from electrical signals, said apparatus comprising a recording medium, means for recording said signals on said recording medium, means for reproducing the signals recorded on said recording medium, and means for selectively varying the position of said reproducing means with respect to said recording medium in accordance with jitter components in said signals whereby the position of said reproducing means with respect to said recording medium is varied in proportion to the jitter components in said signals to reproduce signals having no jitter components.

2. Apparatus for elminating jitter components from reproduced video signals, said apparatus comprising a recording medium, means for reproducing the signals recorded on said recording medium, and means for selectively varying the position of said reproducing means with respect to said recording medium in accordance with jitter components in said signals whereby the position of said reproducing means with respect to said recording medium is varied in proportion to the jitter components in said signals to reproduce signals having no jitter components.

3. Apparatus for eliminating jitter components from reproduced video signals, said apparatus comprising a magnetic recording medium, a recording head for recording said video signals on said medium, means for reproducing said signals from said medium, control means for varying the position of said reproducing means with respect to said recording medium, and means for activating said control means in proportion to the jitter components in said video signal whereby said reproducing head is moved to reproduce video signals having no jitter components.

4. Apparatus for eliminating jitter components from reproduced video signals, said apparatus comprising a magnetic recording medium, a recording head for recording said video signals on said medium, means for reproducing said signals from said medium, control means for varying the position of said reproducing means with respect to said recording medium, a reference signal, detector means for comparing said reproduced signal with said reference signal whereby a signal output is generated proportional to the jitter components in said signal, and said detector output being connected to said control means whereby said control means is activated in proportion to the jitter components in said video signal whereby said reproducing head is moved to reproduce video signals having no jitter components.

5. Apparatus for eliminating jitter components from reproduced video signals containing a synchronizing signal, said apparatus comprising a magnetic recording medium, a reference signal, a recording head for recording said video signals on said medium, means for reproducing said signals from said medium, means for separating said synchronizing signal from said video signals, control means for varying the position of said reproducing means with respect to said recording medium, detector means for comparing said synchronizing signal with said reference signal whereby an error signal output is generated proportional to the jitter components in said signal, and said detector output being connected to said control means whereby said control means is activated in proportion to the jitter components in said video signal whereby said reproducing head is moved to reproduce video signals having no jitter components.

6. Apparatus for eliminating jitter components from video signals containing a synchronizing signal and reproduced by video recording and reproducing means, said apparatus comprising a magnetic recording medium, means for rotating said medium, a reference signal, a recording head for recording said video signals on said medium, means for reproducing said signals from said medium, means for separating said synchronizing signal from said video signals, control means for varying the position of said reproducing means with respect to said recording medium, detector means for comparing said synchronizing signal with said reference signal whereby an error signal output is generated proportional to the jitter components in said signal, and said detector output being connected to said control means whereby said control means is activated in proportion to the jitter components in said video signal whereby said reproducing head is moved to reproduce video signals having no jitter components.

7. Apparatus in accordance with claim 6 wherein said magnetic recording medium is rotated by a synchronous motor.

8. Apparatus in accordance with claim 7 wherein said synchronous motor is energized by said reference signal source.

9. Apparatus for eliminating jitter components from video signals containing a synchronizing signal and reproduced by video recording and reproducing means, said apparatus comprising a magnetic recording medium, a recording head for recording said video signals on said medium, means for reproducing said signals from said medium, means for separating said synchronizing signal from said video signals, control means for varying the position of said reproducing means with respect to said recording medium, means for automatic frequency control of said synchronizing signal, and said control means being energized by said automatic frequency control whereby an error signal output is generated proportional to the jitter components in said signal, and said output being connected to said control means whereby said control means is activated in proportion to the jitter components in said video signal whereby said reproducing head is moved to reproduce video signals having no jitter components.

10. Apparatus for eliminating jitter components from video signals containing a synchronizing signal and reproduced by video recording and reproducing means, said apparatus comprising a magnetic recording medium, means for rotating said medium, a recording head for recording said video signals on said medium, means for reproducing said signals from said medium, means for separating said synchronizing signal from said video signals, control means for varying the position of said reproducing means with respect to said recording medium, means for automatic frequency control of said synchronizing signal, and said control means being energized by said automatic frequency control whereby an error signal output is generated proportional to the jitter components in said signal, and said output being connected to said control means whereby said control means is activated in proportion to the jitter components in said video signal whereby said reproducing head is moved to reproduce video signals having no jitter components.

11. Apparatus in accordance with claim 10 wherein a fixed and a movable reproducing head are provided, said synchronizing signal being derived from signals reproduced by said fixed reproducing head.

References Cited

UNITED STATES PATENTS

| | | |
|---|---|---|
| 3,050,594 | 8/1062 | Bick. |
| 3,334,193 | 8/1967 | Dow. |

ROBERT L. GRIFFIN, *Primary Examiner.*

H. W. BRITTON, *Assistant Examiner.*

U.S. Cl. X.R.

179—100.2